United States Patent
Kim et al.

(10) Patent No.: US 7,725,109 B2
(45) Date of Patent: *May 25, 2010

(54) SYSTEM AND METHOD FOR ASSIGNING A SUB-CHANNEL IN A BWA COMMUNICATION SYSTEM

(75) Inventors: Jun-Hyung Kim, Seoul (KR); Jung-Won Kim, Seoul (KR); Jeong-Heon Kim, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/255,400

(22) Filed: Oct. 21, 2008

(65) Prior Publication Data

US 2009/0109910 A1    Apr. 30, 2009

Related U.S. Application Data (63) Continuation of application No. 11/266,940, filed on Nov. 4, 2005, now Pat. No. 7,526,292.

(30) Foreign Application Priority Data

Nov. 4, 2004    (KR) ............... 2004-89369

(51) Int. Cl.
*H04W 72/00* (2009.01)
(52) U.S. Cl. ............... 455/450; 455/452.1; 370/329; 370/342; 370/431
(58) Field of Classification Search ........ 455/450, 455/452.1; 370/329, 342, 431
See application file for complete search history.

(56) References Cited

U.S. PATENT DOCUMENTS

| | | | |
|---|---|---|---|
| 6,728,544 | B1 | 4/2004 | Boyer et al. |
| 2003/0123559 | A1 | 7/2003 | Classon et al. |
| 2003/0134639 | A1 | 7/2003 | Karger |
| 2005/0201309 | A1 | 9/2005 | Kang et al. |
| 2005/0201327 | A1 | 9/2005 | Kim et al. |
| 2005/0238108 | A1 | 10/2005 | Suh et al. |
| 2005/0245258 | A1 | 11/2005 | Classon et al. |
| 2007/0274253 | A1 | 11/2007 | Zhang et al. |
| 2008/0130613 | A1 | 6/2008 | Tiedemann et al. |

FOREIGN PATENT DOCUMENTS

| | | |
|---|---|---|
| EP | 1 330 049 | 7/2003 |
| EP | 1 447 933 | 8/2004 |
| RU | 2 209 528 | 5/1996 |
| WO | WO 96/37079 | 11/1996 |

*Primary Examiner*—Barry W Taylor
(74) *Attorney, Agent, or Firm*—The Farrell Law Firm, LLP (57) ABSTRACT

A method for requesting a Base Station (BS) to assign sub-channels to a Subscriber Station (SS) in a communication system, The method includes determining a channel quality of sub-channels assigned using a normal sub-channel assignment scheme, transmitting, to the BS, a first codeword of a Channel Quality Indicator CHannel (CQICH) indicating a transition from the normal sub-channel assignment scheme to a band Adaptive Modulation and Coding (AMC) sub-channel assignment scheme, during a sub-channel assignment scheme transition based on the determined channel quality, transmitting a second codeword of the CQICH and a report response message in response to a report request message received from the BS, and transmitting, to the BS, differential Channel Quality Indicators (CQI) of the selected bands.

26 Claims, 3 Drawing Sheets

SYSTEM AND METHOD FOR ASSIGNING A SUB-CHANNEL IN A BWA COMMUNICATION SYSTEM

PRIORITY

This application is a continuation of U.S. application Ser. No. 11/266,940, which was filed on Nov. 4, 2005 now U.S. Pat. No. 7,526,292, and claims priority to an application entitled "System and Method for assigning Sub-channel in BWA Communication System" filed in the Korean Intellectual Property Office on Nov. 4, 2004 and assigned Ser. No. 2004-89369, the contents of which are hereby incorporated by reference.

BACKGROUND OF THE INVENTION

1. Field of the Invention

The present invention relates generally to a Broadband Wireless Access (BWA) communication system, and more particularly to a system and a method for assigning a sub-channel in a BWA communication system.

2. Description of the Related Art

Communication systems are now capable of providing voice services, data services, and various multimedia services. However, because the conventional voice-based communication system has a relatively small data transmission bandwidth and imposes high service charges on users, it is difficult to satisfy the increasing service demands of users.

In addition, with the development of communication industry and increase of user demands for an Internet service, it is more necessary to provide a communication system capable of satisfying the user demands.

Accordingly, a BWA communication system has been proposed, which has enough broadband to satisfy the user demands while efficiently providing an Internet service.

The BWA communication system integrates voice, low speed dates services and high speed data services with multimedia application services for high quality dynamic images, and then deliver these integrated services. The BWA communication system is capable of connecting to a Public Switched Telephone Network (PSTN), a Packet Data Serving Node (PDSN) network, an Internet network, an International Mobile Telecommunication (IMT)-2000network, an Asynchronous Transfer Mode (ATM) network, etc., through wireless media using a broadband including 2 GHz, 5 GHz, 2 GHz, 60 GHz, etc. Further, the BWA communication system is capable of supporting a channel transmission rate of more than 2 Mbps.

Commonly, the BWA communication system is classified into a Broadband Wireless Local Loop (BWLL), a Broadband Radio Access Network (BRAN), and a high speed Wireless Local Area Network (WLAN) according to a terminal's mobility (stationary or mobile), communication environments (indoor or outdoor), and a channel transmission rate.

The radio access scheme of the BWA communication system has been standardized by an Institute of Electrical and Electronics Engineers (IEEE) 802.16 standardization group. The IEEE 802.16 standardization group is currently establishing an IEEE 802.16d standard and an IEEE 802.16e standard as a standard for providing a wireless broadband Internet service to stationary terminals or mobile terminals. In particular, research is being performed to support a high speed service capable of ensuring mobility and various levels of Quality of Service (QoS) in a BWA communication system such as a WLAN communication system and a wireless Metropolitan Area Network (MAN) communication system.

Representative communication systems of the BWA communication system are the IEEE 802.16d communication system and the IEEE 802.16e communication system (hereinafter commonly referred to as IEEE 802.16d/e communication systems).

The IEEE 802.16d/e communication systems utilize an Orthogonal Frequency Division Multiplexing (OFDM) scheme/an Orthogonal Frequency Division Multiple Access (OFDMA) scheme in order to support a broadband transmission network for a physical channel of the wireless MAN system. However, the IEEE 802.16d communication system considers only a single cell structure and stationary Subscriber Station (SS), which means the system does not accommodate the mobility of the SSs at all. The IEEE 802.16e communication system accommodates the mobility of an SS in the IEEE 802.16d communication system. Herein, an SS having the mobility will be referred to as a Mobile Station (MS).

Because the IEEE 802.16d/e communication systems have a wide data transmission bandwidth as compared to radio technology for an existing voice service, they can transmit mass storage data in a short amount of time and efficiently use channels by sharing all user channels. Further, because the IEEE 802.16d/e communication systems ensure QoS, users can receive various services of different qualities according to the characteristics of a service.

In the IEEE 802.16d/e communication systems, because all users connected to a Base Station (BS) share and use a common channel and intervals, for which each user uses the channel, are assigned by the BS in each uplink and downlink frame, the BS must inform each user of uplink and downlink access information so that each user can separately use the channel.

Figure 1:
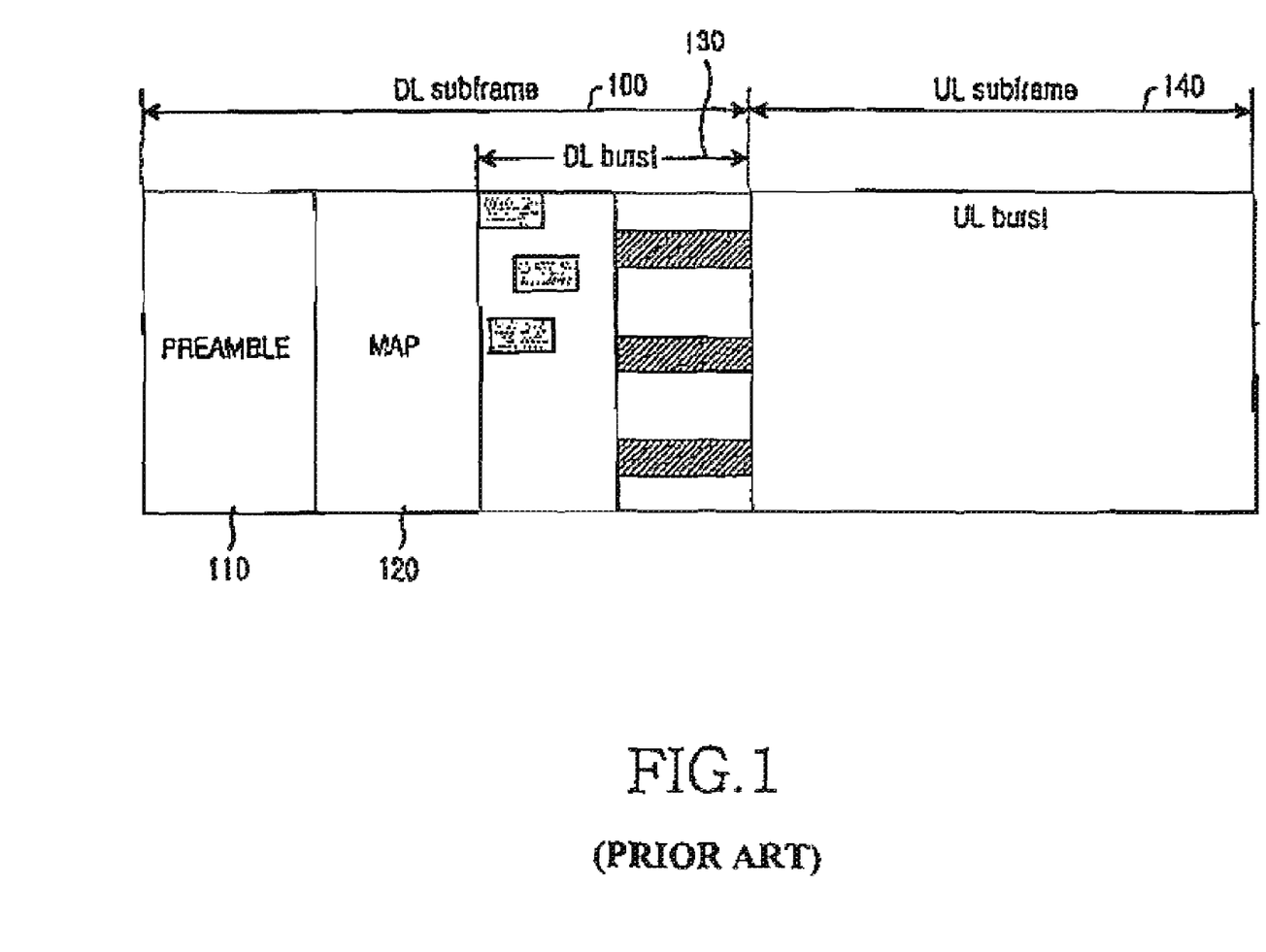
FIG. 1 is a diagram schematically illustrating a conventional frame structure of a BWA communication system.

Accordingly, the IEEE 802.16d/e communication systems classify channel information into uplink and downlink channel information, define information for each channel by Type, Length and Value (TLV), insert the defined information for each channel into a Downlink Channel Descriptor (DCD) message and a Uplink Channel Descriptor (UCD) message, aid periodically transmit the DCD and UCD messages to all users, thereby informing SSs of characteristic information for channels, FIG. 1 is a diagram schematically illustrating a conventional frame structure of an IEEE 802.16d or IEEE 802.16e communication system.

Referring to FIG. 1, a frame is classified into a downlink (DL) sub-frame 100 and an uplink (UL) sub-frame 140. The downlink sub-frame 100 includes a preamble field 110, an MAP field 120, and a downlink (DL) burst field 130. The preamble field 110 is a field through which synchronization signals, i.e., a downlink preamble sequence, are transmitted in order to acquire synchronization between a BS and SSs. The MAP field 120 is a field through which a downlink-MAP message is transmitted, and the DL burst field 130 is a field through which downlink data targeting the SSs are transmitted. The downlink sub-frame 100 includes sub-channels assigned through a normal sub-channel assignment scheme and a band Adaptive Modulation and Coding (AMC) sub-channel assignment scheme, The uplink sub-frame 140 includes an uplink (LJL) burst field through which uplink data targeting the BS are transmitted from the SSs.

The IEEE 802.16 d/e communication systems assign resources to each user through an uplink and a downlink by the sub-channel, which is a set of specific sub-carriers. The band AMC sub-channel assignment scheme adaptively changes a modulation technique and a coding technique according to wireless environments in order to improve the data transmission efficiency. Further, because it's a basic algorithm for the band AMC sub-channel assignment scheme is already known to those skilled to the art, a detailed description will be omitted.

The normal sub-channel assignment scheme may include a Partial Usage Sub-Channel (PUSC) assignment scheme, a Full Usage Sub-Channel (FUSC) assignment scheme, an optional FU)SC assignment scheme, an AMC permutation assignment scheme, etc. For an uplink, a PUSC, an optional FUSC, an AMC permutation, etc., exist. All other sub-channel assignment schemes excluding the band AMC sub-channel assignment scheme basically assign sub-carriers randomly scattered in an entire frequency domain to one sub-channel, thereby causing each user receiving sub-channels to acquire frequency diversity gain.

In the IEEE 802.I6 d/e communication systems, a BS assigns Channel Quality Indicator Channels (CQICHs) for reporting its own Channel Quality Indicator (CQI) to the SSs, and each of the SSs informs the BS of its own channel conditions through the assigned CQICH. The CQICH is a uplink channel used when the SS measures and compares reception qualities of downlink pilot channels received from BSs included in an active set, selects one BS from which the SS is to receive downlink packet data, and feedbacks the reception qualities of the pilot channels to the BS. That is, the CQICH represents a channel assigned to the SSs for the CQI.

More specifically, in the IEEE 802.16 d/e communication systems, the BS assigns the CQICH to all SSs, and each SS may transfer the CQI of 5 bits or 6 bits to the BS through the CQICH. For example, because the CQI of 6 bits, which may be transmitted from each SS through the CQICH corresponds to $2^6$, it is possible to use the total 64 codewords. From among the 64 codewords, 32 codewords are used in order to report a Carrier-to-Interference Noise Ratio (CINR) value of a channel to the BS. With the exception of the already defined codewords used for other purposes of the other 32 codewords not being used for reporting the CINR value, seven codewords have not yet been currently defined.

If an SS has received a sub-channel through the normal sub-channel assignment scheme, the SS transitions an average CINR value for a Whole bandwidth according to $32(2^5)$ levels for a 5 bit encoding, and transmits encoding results to a BS through the CQICH.

If an SS has received a sub-channel through the band AMC sub-channel assignment scheme, the SS selects five bands having the best channel conditions, and transmits a differential value between CINR values for the selected bands to the BS. When the differential value received from the SS is 1, the BS determines that a CINR value of the current frame is larger than a CINR value of the previous frame. However, when the differential value is 0, the BS determines that the CINR value of the current frame is smaller than the CINR value of the previous frame.

When the BS assigns sub-channels through the band AMC sub-channel scheme, it is necessary to report CINR values for each band of the SSs to which the sub-channels are assigned.

Figure 2:
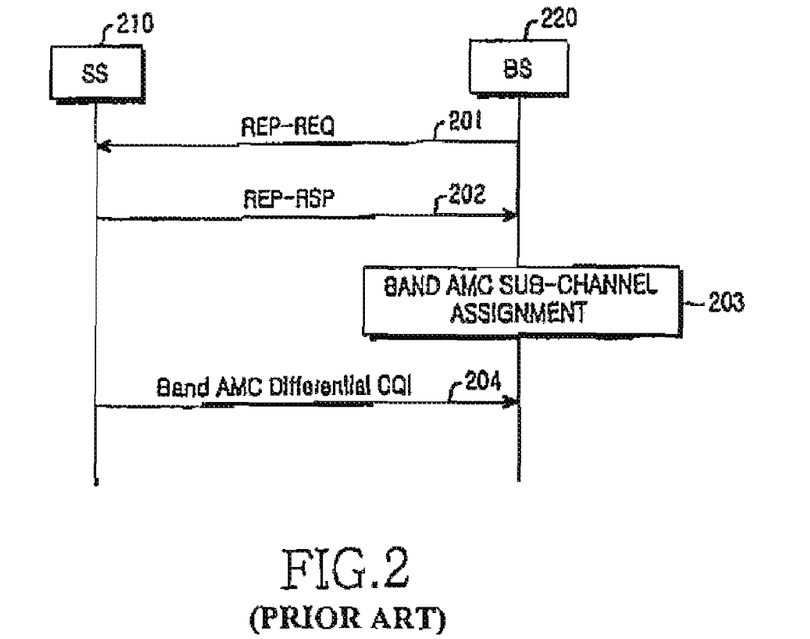
FIG. 2 is a flow diagram illustrating a conventional signal flow for sub-channel assignment between a BS and an SS in a BWA communication system.
Figure 3:
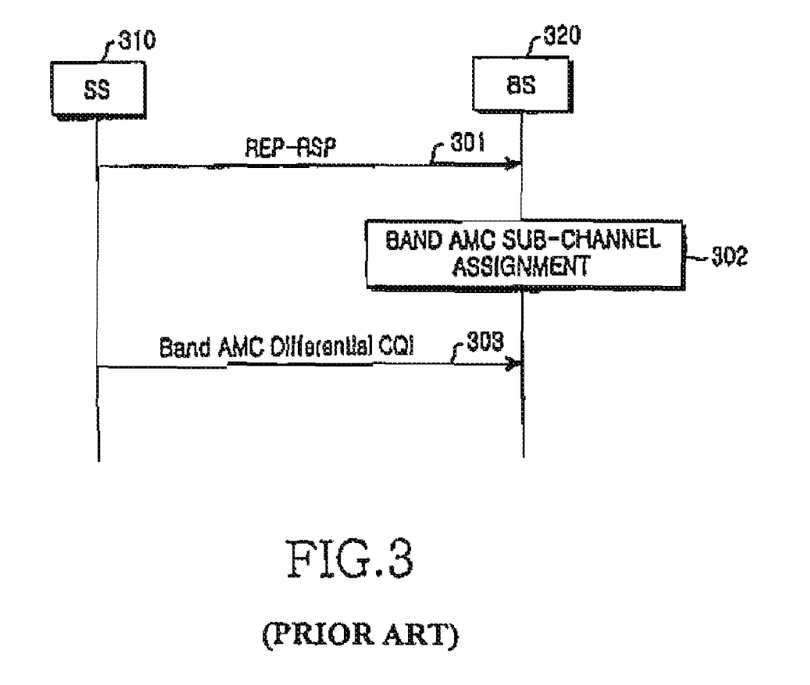
FIG. 3 is a flow diagram illustrating a conventional signal flow for sub-channel assignment between a BS and all SS in a BWA communication system.

FIGS. 2 and 3 are flow diagrams schematically illustrating conventional signal flows for sub-channel assignment between a BS and an SS in wither an IEEE 802.16d or IEEE 802.16e communication system. More specifically, FIG. 2 is a flow diagram illustrating a BS transmitting a CQI request to the SS and assigning a sub-channel to the SS, and FIG. 3 is a flow diagram illustrating an SS requesting the BS to assign a sub-channel by transmitting a CQI to the BS.

Referring to FIG. 2, the BS 220 transmits a CQI Report Request (REP-RFQ) message to the SS 210 in step 201. The SS 210 transmits a Report Response (REP-RSP) message including its own CQI to the BS 220 in response to the REP-REQ message in step 202. After receiving the REP-RSP message including the CQI from the SS 210, the BS 220 assigns a sub-channel through the band AMC sub-channel assignment scheme in step 203. After receiving the sub-channel from the BS 220 through the band AMC sub-channel assignment scheme, the SS 210 selects five bands having the best channel conditions, and transmits a CQI including a differential value between CINR values for the five selected bands, i.e., a Band AMC Differential CQI, to the BS 220 from a frame, after transmitting the REP-RSP message in step 204.

Referring to FIG. 3, when the SS 310 is to receive a sub-channel from the BS 320 through the band AMC sub-channel assignment scheme, the SS 310 transmits the REP-RSP message including its own CQI to the BS 320 without reception of the REP-REQ message. That is, the SS 310 informs the BS 320 that the SS 310 is to first receive the sub-channel through the band AMC sub-channel assignment scheme in step 301. The BS 320 assigns the sub-channel through the band AMC sub-channel assignment scheme in step 302.

After receiving the sub-channel from the BS 320 through the band AMC sub-channel assignment scheme, the SS 310 selects five bands having tie best channel conditions, and transmits a CQI including a differential value between CINR values for the five selected bands, i.e., a Band AMC Differential CQI, to the BS 320 from a frame after transmitting the REP-RSP message in step 303.

When a BS assigns a sub-channel through the normal sub-channel assignment scheme, the BS assigns the sub-channel by using the downlink MAP message of the MAP field 120 in FIG. I without using separate signals through the normal sub-channel assignment scheme, and an SS having received the sub-channel from the BS through the normal sub-channel assignment scheme reports an average CINR value for a whole bandwidth to the BS. That is, when the SS receives the sub-channel through the band AMC sub-channel assignment scheme, the SS selects five bands having the best channel conditions, and reports only a differential value between CINR values for the five selected bands. However, when the SS receives the sub-channel through the normal sub-channel assignment scheme, the SS reports the average CINR value for the whole bandwidth to the BS.

Herein, in the IEEE 802.16 d/e communication systems, it may be impossible for a BS to normally receive the REP-RSP message transmitted from an SS for reception of the sub-channel through the band AMC sub-channel assignment scheme. When the BS has not normally received the REP-RSP message from the SS, the BS may determine the differential value between the CINR values for the five bands having the best channel conditions, which is transmitted from a frame after the SS has transmitted the REP-RSP message, as the average CINR value for the whole bandwidth. Therefore, a problem may occur in the sub-channel assignment through the band AMC scheme and it may be difficult to provide a communication service to the SS. Further, the stability and reliability of the system may deteriorate

SUMMARY OF THE INVENTION

Accordingly, the present invention has been designed to solve the above and other problems occurring in the prior art. It is an object of the present invention to provide a system and a method for assigning a sub-channel according to a CQI in a BWA communication system.

It is another object of the present invention to provide a system and a method for stably assigning a sub-channel by using either a normal sub-channel assignment scheme or a band AMC sub-channel assignment scheme in a SWA communication system.

It is further another object of the present invention to provide a system and a method for a sub-channel assignment, which prevents a problem from occurring during conversion to either a normal sub-channel assignment scheme or a band AMC sub-channel assignment scheme in a BWA communication system.

In order to accomplish the above and other objects, according to an aspect of the present invention, a method for requesting a Base Station (BS) to assign sub-channels to a Subscriber Station (SS) in a communication system is provided. The method includes: determining a channel quality of sub-channels assigned using a normal sub-channel assignment scheme; transmitting, to the BS, a first codeword C1 of a Channel Quality Indicator CHannel (CQICH) indicating a transition from the normal sub-channel assignment scheme to a band Adaptive Modulation and Coding (AMC) sub-channel assignment scheme, when the SS determines to transition from the normal sub-channel assignment scheme to the band AMC sub-channel assignment scheme based on the determined channel quality; transmitting a second codeword C2 of the CQICH and a report response message in response to a report request message received from the BS, wherein the second codeword indicates that the report response message includes Carrier-to-Interference Noise Ratio (CINR) measurements of bands selected for the band AMC sub-channel assignment scheme; and transmitting, to the BS, differential Channel Quality Indicators (CQI) of the selected bands.

In accordance with another aspect of the present invention, a method for assigning, by a Base Station (BS), sub-channels to a Subscriber Station (SS) in a communication system is provided. The method includes: receiving a first codeword C1 of a Channel Quality Indicator CHannel (CQICH) from the SS, the first codeword indicating a transition from a normal sub-channel assignment scheme to a band Adaptive Modulation and Coding (AMC) sub-channel assignment scheme; transmitting a report request message to the SS; receiving a second codeword C2 of the CQICH and a report response message from the SS in response to the report request message, wherein the second codeword indicates that the report response message includes Carrier-to-Interference Noise Ratio (CINR) measurements of bands selected for the band AMC sub-channel assignment scheme; and receiving differential Channel Quality Indicators (CQI) of the selected bands.

In accordance with another aspect of the present invention, a system for assigning sub-channels in a communication system is provided. The system includes: a Base Station (BS); and a Subscriber Station (SS) for determining a channel quality of sub-channels assigned by a normal sub-channel assignment scheme, transmitting, to the BS, a first codeword C1 of a Channel Quality Indicator CHannel (CQICH) indicating a transition from the normal sub-channel assignment scheme to a band Adaptive Modulation and Coding (AMC) sub-channel assignment scheme, when the SS determines to transition from the normal sub-channel assignment scheme to the band AMC sub-channel assignment scheme based on the determined channel quality, transmitting a second codeword C2 of the CQICH and a report response message in response to a report request message received from the BS, wherein the second codeword indicates that the report response message includes Carrier-to-Interference Noise Ratio (CINR) measurements of bands selected for the band AMC sub-channel assignment scheme, and transmitting, to the BS, differential Channel Quality Indicators (CQI) of the selected bands.

In accordance with another aspect of the present invention, a system for assigning sub-channels in a communication system is provided. The system includes: a Subscriber Station (SS); and a Base Station (BS) for receiving a first codeword C1 of a Channel Quality Indicator CHannel (CQICH) from the SS, the first codeword indicating a transition from a normal sub-channel assignment scheme to a band Adaptive Modulation and Coding (AMC) sub-channel assignment scheme, transmitting a report request message to the SS, receiving a second codeword C2 of the CQICH and a report response message from the SS in response to the report request message, wherein the second codeword indicates that the report response message includes Carrier-to-Interference Noise Ratio (CINR) measurements of bands selected for the band AMC sub-channel assignment scheme, and receiving differential Channel Quality Indicators (CQI) of the selected bands.

In accordance with another aspect of the present invention, a system for assigning sub-channels in a communication system is provided. The system includes: a Subscriber Station (SS) for determining a channel quality of sub-channels assigned by a normal sub-channel assignment scheme, transmitting a first codeword C1 of a Channel Quality Indicator CHannel (CQICH) indicating a transition from the normal sub-channel assignment scheme to a band Adaptive Modulation and Coding (AMC) sub-channel assignment scheme, when the SS determines to transition from the normal sub-channel assignment scheme to the band AMC sub-channel assignment scheme based on the determined channel quality, transmitting a second codeword C2 of the CQICH and a report response message in response to a report request message received, wherein the second codeword indicates that the report response message includes Carrier-to-Interference Noise Ratio (CINR) measurements of bands selected for the band AMC sub-channel assignment scheme, and transmitting differential Channel Quality Indicators (CQI) of the selected bands; and a Base Station (BS) for receiving the first codeword from the SS, transmitting the report request message to the SS, receiving the second codeword C2 and the report response message from the SS in response to the report request message, and receiving the differential CQI of the selected bands.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description, a detailed description of known functions and configurations incorporated herein will be omitted when it may obscure the subject matter of the present invention.

In general, the present invention provides a system and a method for assigning a sub-channel in a Broadband Wireless Access (BWA) communication system, e.g., an Institute of Electrical and Electronics Engineers (IEEE) 802.16d communication system and an IEEE 802.16 e communication system. Further, the present invention provides a system and a method in which a Base Station (BS) assigns a sub-channel to a Subscriber Station (SS) in a BWA communication system.

In the BWA communication system according to an embodiment of the present invention, the BS assigns a Channel Quality Indicator Channels (CQICH) to the SS in order to report its own Channel Quality Indicator (CQI), and the SS informs the BS of its own CQI through the assigned CQICH. Then, the BS assigns a sub-channel according to the CQI of the SS transmitted through the CQICH. Herein below, the term "SS" includes both stationary SSs and SSs having mobility, i.e., MSs.

The present invention describes a system and a method in which a BS assigns the CQICH of 6 bits, an SS transmits its own CQI to the BS through the assigned CQICH, and the BS assigns a sub-channel by using a normal sub-channel assignment scheme, which is a first sub-channel assignment scheme, or a band Adaptive Modulation and Coding (AMC) sub-channel assignment scheme, which is a second sub-channel assignment scheme, according to the received CQI. The normal sub-channel assignment scheme represents an assignment scheme excluding the band AMC sub-channel assignment scheme, and may include a Partial Usage Sub-Channel (PUSC) assignment scheme, a Full Usage Sub-Channel (FUSC) assignment scheme, an optional FUSC assignment scheme, an AMC permutation assignment scheme, etc.

In the BWA communication system according to the present invention, the BS assigns the CQICH of 6 bits to the SS, and the SS informs the BS of its own CQI through the CQICH of 6 bits. The CQI that may be transmitted through the CQICH of 6 bits may use a total of 64 codewords. From among the 64 codewords, 32 codewords are used to report a Carrier-to-Interference Noise Ratio (CINR) value of a channel. With die exception of the already defined codewords used for other purposes of the other 32 codewords not being used for reporting the CINR value, seven remaining codewords have not yet been defined.

Accordingly, the present invention newly defines and uses three codewords of the seven remaining undefined codewords. More specifically, the present invention newly defines and uses the three codewords, and assigns a sub-channel by using either the normal sub-channel assignment scheme, which is a first sub-channel assignment scheme, or the band AMC sub-channel assignment scheme, which is a second sub-channel assignment scheme. For convenience of description, the three codewords will be referred to as a first codeword C1, a second codeword C2, and a third codeword C3, respectively.

The first codeword C1 is transmitted from an SS to a BS through a CQICH, which is a dedicated control channel. That is, the first codeword C1 is transmitted from an SS to request the BS to transition a sub-channel assignment scheme from the normal sub-channel assignment scheme, i.e., the first assignment scheme, to the band AMC sub-channel assignment scheme, i.e., the second assignment scheme, and to assign a sub-channel. That is, the BS having received the C1 from the SS through the CQICH transitions the sub-channel assignment scheme from the normal sub-channel assignment scheme to the band AMC sub-channel assignment scheme, and then assigns the sub-channel to the SS.

The second codeword C2 is transmitted from the SS to the BS through the CQICH, which is the dedicated control channel when the BS having received the C1 assigns the sub-channel by using the band AMC sub-channel assignment scheme. That is, the second codeword C2 reports to the BS that the SS selects five bands having the best channel conditions and then is to transmit information, i.e., CQI for the selected bands to the BS. That is, the C2 is transmitted to the BS through the CQICH, after the SS transmits the C 1.

The third codeword C3 is transmitted from the SS to the BS through the CQICH, which is the dedicated control channel. That is, the third codeword C3 is transmitted to request the BS to transition the sub-channel assignment scheme from the band AMC sub-channel assignment scheme to the normal sub-channel assignment scheme and to assign the sub-channel. That is, the BS, having received the C3 from the SS through the CQICH, transitions the sub-channel assignment scheme from the band AMC sub-channel assignment scheme to the normal sub-channel assignment scheme, and then assigns the sub-channel to the SS. In the sub-channel assignment scheme request to the BS, the SS determines the necessity of the sub-channel assignment scheme conversion according to its own CQI, and transmits the three codewords to the BS through the CQICH according to results of the determination. The BS receives the three codewords through the CQICH, and assigns the sub-channel using either the normal sub-channel assignment scheme or the band AMC sub-channel assignment scheme according to the three received codewords and the CQI based on the user demand. Further, a process in which the SS determines the necessity of the sub-channel assignment scheme conversion will be described in detail with reference to Table 1.

Figure 4:
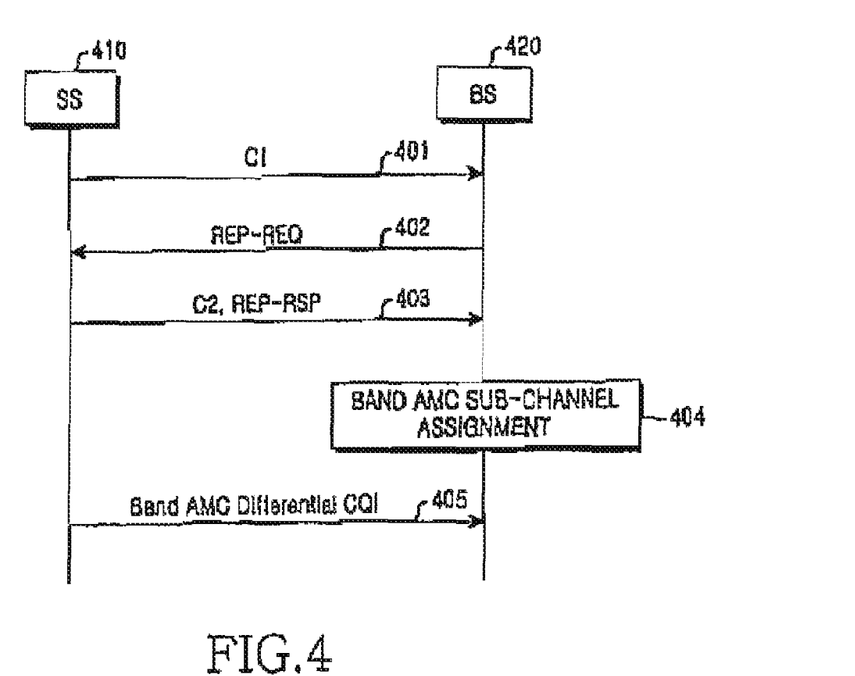
FIG. 4 is a flow diagram illustrating a signal flow for sub-channel assignment between a BS and an SS in a BWA communication system according to an embodiment of the present invention.

FIG. 4 is a flow diagram illustrating a signal flow for sub-channel assignment between a BS and an SS in a BWA communication system according to an embodiment of the present invention. More specifically, FIG. 4 illustrates a flow diagram when the BS transitions a sub-channel assignment scheme from a normal sub-channel assignment scheme to a band AMC sub-channel assignment scheme, and assigns a sub-channel. That is, FIG. 4 illustrates a flow diagram When the BS performs conversion to the band AMC sub-channel assignment scheme in a state in which the BS has assigned the sub-channel to the SS by using the normal sub-channel assignment scheme.

Referring to FIG. 4, it is initially assumed that the SS 410 has received the sub-channel from the BS 420 through the normal sub-channel assignment scheme as described above. Thereafter, when the SS 410 determines that it is necessary to transition the sub-channel assignment scheme through its own CQI, i.e., when the SS 410 determines that it is necessary to transition the sub-channel assignment scheme from the normal sub-channel assignment scheme to the band AMC sub-channel assignment scheme, the SS 410 transmits the first codeword C1 to the BS 420 through a CQICH in step 401. The CQICH is a channel having been already assigned by the BS 420 in order to receive the CQI from the SS 410, and 6 bits are assigned to the CQICH as described above.

The C1 is transmitted from the SS 410 in order to receive the sub-channel from the BS 420 through the band AMC sub-channel assignment scheme transitioned from the normal sub-channel assignment scheme as described above. That is, the SS 410 transmits the C1 to the BS 420 through the CQICH in order to receive the sub-channel from the BS 420 through the band AMC sub-channel assignment scheme. Because the process in which the SS 410 determines that it is necessary to transition the sub-channel assignment scheme from the normal sub-channel assignment scheme to the band AMC sub-channel assignment scheme will be described in detail with reference to Table 1 below, a detailed description will be omitted here.

The BS 420, having received the C1, transmits a CQI Report-Request (REP-REQ) message to the SS 410 in order to cause the SS 410 to transmit its own CQI in step 402. The SS 410 then measures CINR values of five bands having the best channel conditions in a whole bandwidth, and transmits a Report Response (REP-RSP) message including a CQI having the measured CINR values to the BS 420 through the CQICH in response to the REP-REQ message. Further, the SS 410 transmits the second codeword C2 to the BS 420 through the CQICH in step 403. The second codeword C2 reports that the SS 410 is to transmit information, i.e., the CINR values, for the five bands having the best channel conditions to the BS through the REP-RSP message in order to cause the BS 420 to assign the sub-channel through the band AMC sub-channel assignment scheme. That is, the C2 is reports that the SS 410 is to transmit the CQI, which includes a differential value, i.e., Band AMC Differential, of the CINR values for the five selected bands, in a frame next to the frame through which the REP-RSP message is transmitted. The differential value of the CINR values represents an incremental and decremental value between the CINR values for the five bands selected in a frame through which the REP-RSP message is transmitted and the CINR values for tie five bands selected in the next frame after a frame through which the REP-RSP message has been transmitted.

After receiving the REP-RSP message and the C2 from the SS 410 through the CQICH, the BS 420 assigns the sub-channel to the SS 410 through the band AMC sub-channel assignment scheme in step 404. Even when the BS 420 does not receive the REP-RSP message, the BS 420 receives the C2 from the SS 410 through the CQICH, which is a dedicated control channel, thereby recognizing that the SS 410 selects the five bands having the best channel conditions and then transmits both the CINR value for the selected bands mid the differential value of the CINR values in the next frame.

After receiving the sub-channel from the BS 420, the SS 410 transmits the CQI, which includes the differential value, i.e., Band AMC Differential CQI, of the CINR values for the five selected bands having the best channel conditions, to the BS 420 in step 405. That is, the SS 410, having received the sub-channel, already knows the CINR value measured from tie five selected bands having the best channel conditions in the flame through which the REP-RSP message is transmitted, and measures a CINR value for the five selected bands again in the next frame after the frame through which the REP-RSP message is transmitted. Further, the SS 410 computes a differential value between the measured CINR values for the five selected bands in the two frames, and transmits the differential value to the BS 420.

For example, when the CINR value measured in the frame through which the REP-RSP message has been transmitted is smaller than the CINR value measured in the next frame, i.e., when the CINR value has increased, the SS 410 transmits a CQI having the differential value of 1 to the BS 420. However, when the CINR value measured in the frame through which the RP-RSP message has been transmitted is larger than the CINR value measured in the next frame, i.e., when the CINR value has decreased, the SS 410 transmits a CQI having the differential value of 0 to the BS 420.

After receiving the differential value between the CINR values for the five bands having the best channel conditions from the SS 410 through the CQICH as described above, when the differential value is 1, the BS 420 recognizes that the CINR value of the selected band has increased. However, when the differential value is 0, the BS 420 recognizes that the CINR value of the selected band has decreased.

Further, when the SS 410, having received the sub-channel through the band AMC sub-channel assignment scheme from the BS 420, is to receive another sub-channel, i.e., another band AMC sub-channel, through the band AMC sub-channel assignment scheme, the SS 410 transmits the first codeword C1 to the BS 420. That is, when five bands having the best channel conditions in the previous frame are different from that in the current frame, i.e., when die five bands having the best channel conditions change, the SS 410 having already received the sub-channel through the band AMC sub-channel assignment scheme from the BS 420 transmits the first codeword C1 to the BS 420 through the CQICH in order to receive another band AMC sub-channel. Then, the BS 420 having received the C1 transmits the REP-REQ message to the SS 410, and the SS 410 having received the REP-REQ message transmits the C2 and the REP-RSP message to the BS 420 through the CQICH.

The BS 420 assigns a sub-channel to the SS 410 through the band AMC sub-channel assignment scheme, and the SS 410, having received the sub-channel, transmits a CQI, i.e., a Band AMC Differential CQI, including a differential value of CINR values to the BS 420. That is, an operation between the SS 410 and the BS 420, when the five bands having the best channel conditions selected from a whole bandwidth are varied, is the same as when the SS 410 requests conversion to the band AMC sub-channel assignment scheme from the normal sub-channel assignment scheme.

When the CINR value of the selected band is updated without changing the five bands having the best channel conditions, the SS 410 transmits the C2 and the REP-RSP message to the BS 420, in order to update the CINR value. That is, the SS 410 measures the CINR value of the five selected band again, and transmits the REP-RSP message including a CQI having the measured CINR value to the BS 420 through the CQICH. Further, the SS 410 transmits a CQI to the BS 420 through the CQICH.

Figure 5:
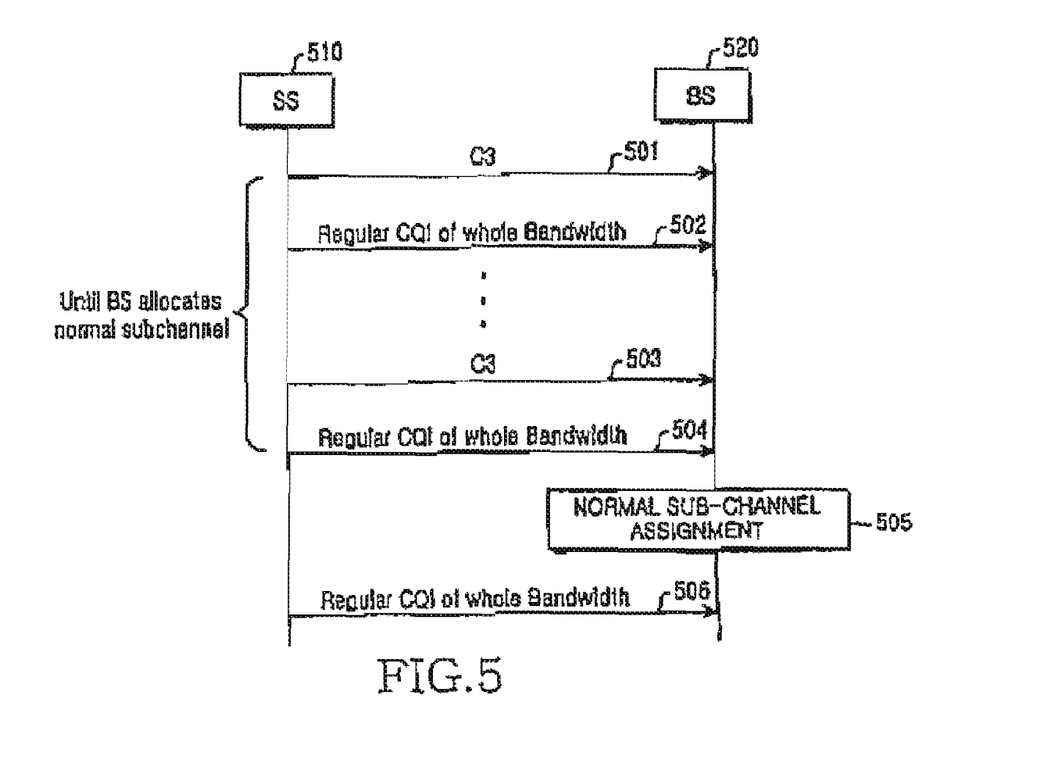
FIG. 5 is a flow diagram illustrating a signal flow for sub-channel assignment between a BS and an SS in the BWA communication system according to an embodiment of the present invention.

FIG. 5 is a flow diagram illustrating a signal flow for sub-channel assignment between a BS and an SS in the BWA communication system according to the present invention, More specifically, FIG. 5 illustrates a flow diagram when the BS transitions a sub-channel assignment scheme from the band AMC sub-channel assignment scheme to the normal sub-channel assignment scheme, and assigns a sub-channel. That is, FIG. 5 illustrates a flow diagram when the BS performs conversion to the normal sub-channel assignment scheme in a state in which the BS has assigned the sub-channel to the SS using the band AMC sub-channel assignment scheme.

Referring to FIG. 5, it is assumed that SS 510 has already received the sub-channel from the BS 420 through the band AMC sub-channel assignment scheme as described above. When the SS 510 determines that it is necessary to transition the sub-channel assignment scheme through its own CQI, i.e., when the SS 410 determines that it is necessary to transition the sub-channel assignment scheme from the band AMC sub-channel assignment scheme to the normal sub-channel assignment scheme, the SS 510 transmits the third codeword C3 to the BS 520 through a CQICH in step 501. The CQICH has been already assigned by the BS 520 in order to receive the CQI from the SS 510, and 6 bits are assigned to the CQICH as described above.

The C3 is transmitted from the SS 510 in order to receive the sub-channel from the BS 420 through the normal sub-channel assignment scheme transitioned from the band AMC sub-channel assignment scheme as described above. That is, the SS 510 transmits the C3 to the BS 520 through the CQICH in order to receive the sub-channel from the BS 520 through die normal sub-channel assignment scheme. Because the process in which the SS 510 determines that it is necessary to transition the sub-channel assignment scheme from the band AMC sub-channel assignment scheme to the normal sub-channel assignment scheme will be described in detail with reference to Table 1 below, a detailed description will be omitted here.

After transmitting the C3 to the BS 520 through the CQICH, the SS 510 measures CINR values for a whole bandwidth, and transmits a CQI (Regular CQI of whole Bandwidth) including an average value of the measured CINR values for the whole bandwidth in step 502. That is, in the band AMC sub-channel assignment scheme as described in FIG. 4, the SS 510 selects the five bands having the best channel conditions from the whole bandwidth, and transmits the differential value of the CINR values for the selected bands. However, in the normal sub-channel assignment scheme, the SS 510 transmits the average value of the CINR values for the whole bandwidth to the BS 520. Further, the SS 510 repeatedly transmits the C3 and the CQI (Regular CQI of whole Bandwidth) including the average value of the CINR values for the whole bandwidth, i.e., the average value for the whole bandwidth, to the BS 520 through the CQICH until the BS 520 assigns a sub-channel to the SS 510 by using the normal sub-channel assignment scheme in step 503 and 504.

After receiving the C3 and the average value for the whole bandwidth from the SS 510, the BS 520 assigns the sub-channel to the SS 510 by using the normal sub-channel assignment scheme in step 505.

After receiving the sub-channel from the BS 520 through the normal sub-channel assignment scheme, the SS 510 transmits the CQI (Regular CQI of whole Bandwidth) including the average value of the CINR values for the whole bandwidth to the BS 520 in step 506.

Table 1 below shows physical specific channel encoding information of a Uplink Channel Descriptor (UCD) message including information for each channel in the BWA communication system according to the embodiment of the present invention.

TABLE 1

| Name | Type (1 byte) | Length | Value |
|---|---|---|---|
| Initial ranging codes | 150 | 1 | Number of initial ranging CDMA codes. Possible values are 0255.a |
| Periodic ranging codes | 151 | 1 | Number of periodic ranging CDMA codes. Possible values are 0255.a |
| Bandwidth request codes | 152 | 1 | Number of bandwidth request codes. Possible values are 0255.a |
| Periodic ranging backoff start | 153 | 1 | Initial backoff window size for periodic ranging contention, expressed as a power of 2. Range: 015 (the highest order bits shall be unused and set to 0). |
| Periodic ranging backoff end | 154 | 1 | Final backoff window size for periodic ranging contention, expressed as a power of 2. Range: 015 (the highest order bits shall be unused and set to 0). |
| Start of ranging codes group | 155 | 1 | Indicates the starting number, S, of the group of codes used for this uplink. All the ranging codes used on this uplink will be between S and ((S + N + M + L) mod 256). Where, N is the number of initial-ranging codes M is the number of periodic-ranging codes L is the number of bandwidth-request codes The range of values is $0 \leq S \leq 255$ |
| Permutation base | 156 | 1 | Determines the UL__IDcell parameter for the sub-carrier permutation to be used on this uplink channel |
| UL allocated sub-channel is bitmap | 157 | 9 | This is a bitmap describing the sub-channel allocated to the segment in the UL, when using the uplink PUSC permutation. The LSB of the first byte shall correspond to sub-channel 0. For any bit that is not set, the corresponding sub-channel shall not be used by the SS on that segment. |

TABLE 1-continued

| Name | Type (1 byte) | Length | Value |
|---|---|---|---|
| Optional permutation UL allocated sub-channel is bitmap | 158 | 13 | This is a bitmap describing the sub-channel allocated to the segment in the UL, when using the uplink optional PUSC permutation (see 8.4.6.2.5). The LSB of the first byte shall correspond to sub-channel 0. For any bit that is not set, the corresponding sub-channel shall not be used by the SS on that segment. |
| Band AMC Allocation Threshold | 159 | 1 | dB unit threshold of the maximum of the standard deviations of the individual band's CINR measurements over time to trigger mode transition from normal sub-channel to Band AMC |
| Band AMC Release Threshold | 160 | 1 | dB unit threshold of the maximum of the standard deviations of the individual band's CINR measurements over time to trigger mode transition from Band AMC to normal sub-channel |
| Band AMC Allocation Timer | 161 | 1 | Frame unit Minimum required number of frames to measure the average and standard deviation for the event of Band AMC triggering |
| Band AMC Release Timer | 162 | 1 | Frame unit Minimum required number of frames to measure the average and standard deviation for the event triggering from Band AMC to normal sub-channel |
| Band Status Reporting MAX Period | 163 | 1 | Frame unit Maximum period between refreshing the Band CINR measurements by the unsolicited REP-RSP |
| Band AMC Retry Timer | 164 | 1 | Frame unit Backoff timer between consecutive mode transitions from normal sub-channel to Band AMC when the previous request is failed |
| Band AMC Entry Average CINR | 173 | 1 | dB unit Threshold of the average CINR of the whole bandwidth to trigger mode transition from normal sub-channel to AMC |
| Safety Channel Allocation Threshold | 165 | 1 | dB unit |
| Safety Channel Release Threshold | 166 | 1 | dB unit |
| Safety Channel Allocation Timer | 167 | 1 | Frame unit |
| Safety Channel Release Timer | 168 | 1 | Frame unit |
| Bin Status Reporting MAX Period | 169 | 1 | Frame unit |
| Safety Channel Retry Timer | 170 | 1 | Frame unit |
| H-ARQ ACK delay for UL burst | 171 | 1 | 1 = one frame offset 2 = two frames offset 3 = three frames offset |
| CQICH Band AMC Transition Delay | 172 | 1 | Frame unit |

As shown in Table 1 the present invention defines new fields for conversion between the normal sub-channel assignment scheme and the band AMC sub-channel assignment scheme in the conventional UCD message, and defines in detail fields having an obscure definition in the conventional UCD message.

A newly added field is "Band AMC Entry Average CINR". The field "Band AMC Entry Average CINR" represents a threshold value for an average CINR value of the whole bandwidth, for conversion to the band AMC sub-channel assignment scheme from die normal sub-channel assignment scheme. That is, when the average CINR value of the whole bandwidth for the sub-channel, which has been assigned to an SS by a BS through the normal sub-channel assignment scheme, exceeds the threshold value defined in the field "Band AMC Entry Average CINR", the SS requests the BS to transition the sub-channel assignment scheme from the normal sub-channel assignment scheme to the band AMC sub-channel assignment scheme, and to assign the sub-channel. Further, the present invention further includes new fields defined in detail within the conventional field.

First, the field "Band AMC Allocation Threshold" represents a maximum threshold value of a standard deviation value of CINR values measured for individual bands, for conversion to the band AMC sub-channel assignment scheme from the normal sub-channel assignment scheme. That is, when the standard deviation value of the CINR values measured for individual bands in the whole bandwidth for the sub-channel of an SS, which has been assigned to the SS by a BS through the normal sub-channel assignment scheme, exceeds the threshold value defined in the field "Band AMC Allocation Thresholds", the SS requests the BS to transition the sub-channel assignment scheme from the normal sub-channel assignment scheme to the band AMC sub-channel assignment scheme, and to assign the sub-channel of the SS.

Further, the field "Band AMC Release Thresholds" is a field corresponding to the field "Band AMC Allocation Threshold", which represents the maximum threshold value of the standard deviation value of the CINR values measured for individual bands, for conversion to the normal sub-channel assignment scheme from the band AMC sub-channel assignment scheme. That is, when the standard deviation value of the CINR values measured for individual bands for the sub-channel, which has been assigned to an SS by a BS through the band AMC sub-channel assignment scheme, exceeds the threshold value defined in the field "Band AMC Release Threshold", the SS requests the BS to transition the sub-channel assignment scheme from the band AMC sub-channel assignment scheme to the normal sub-channel assignment scheme, and to assign the sub-channel of the SS.

The field "Band AMC Allocation Timer" represents a minimum number of frames required in order to measure both an average value of CINR values for the whole bandwidth and the standard deviation value of the CINR values according to individual bands in a process of transition to the band AMC sub-channel assignment scheme from the normal sub-channel assignment scheme.

Further, the field "Band AMC Release Timer" is a field corresponding to the field "Band AMC Allocation Timer", which represents a minimum number of frames required in order to measure both the average value of the CINR values for the whole bandwidth and the standard deviation value of the CINR values according to individual band in a process of conversion to the normal sub-channel assignment scheme from the band AIC sub-channel assignment scheme.

The field "Band Status Reporting MAX Period" represents a maximum period for update of band CINR values measured by an REP-RSP message first generated by an SS. That is, in a state in which the SS receives the sub-channel from the BS through the band AMC sub-channel assignment scheme, when the CINR value of the five bands having the best channel conditions is updated according to a predetermined period without change in the five bandwidths, the SS measures the CINR value to be updated and transmits an REP-RSP message including a CQI having the measured CINR value to the BS, thereby updating the CINR value. Herein, the SS measures the CINR value within the value defined in die field "Band Status Reporting MAX Period", transmits the measured CINR value to the BS, in order to update the CINR value.

The field "Band AMC Retry Timer" represents a time interval for which the BS waits in order to transition the sub-channel assignment scheme to the band AMC sub-channel assignment scheme from the normal sub-channel assignment scheme, when the previous request message has failed, i.e., when the BS has failed to transmit an REP-REQ message to the SS after receiving the first codeword C1 for requesting the conversion to the band AMC sub-channel assignment scheme from the normal sub-channel assignment scheme.

Hereinafter, conditions of the fields defined in Table 1 for conversion between the normal sub-channel assignment scheme and the band AMC sub-channel assignment scheme in the BWA communication system according to the embodiment of the present invention will be described.

First, a case of conversion to the band AMC sub-channel assignment scheme from the normal sub-channel assignment scheme will be described. When a maximum standard deviation value of CINR values measured for individual bands for a sub-channel of an SS, which has been assigned to the SS by a BS through the normal sub-channel assignment scheme, is smaller than the threshold value defined in the field "Band AMC Allocation Threshold", and when an average CINR value of the whole bandwidth for the sub-channel of the SS is larger than the threshold value defined in the field "Band AMC Entry Average CINR", the SS transmits the first codeword C1 to the BS through the CQICH in a state in which the SS receives the sub-channel through the normal sub-channel assignment scheme, thereby requesting the BS to transition the sub-channel assignment scheme to the band AMC sub-channel assignment scheme from the normal sub-channel assignment scheme.

That is, in a process in which the SS requests the BS to transition the sub-channel assignment scheme to the band AMC sub-channel assignment scheme from the normal sub-channel assignment scheme, when the maximum standard deviation value of the CINR values of individual bands, which is measured for time period required in order to measure the average CINR value of the whole bandwidth for the assigned sub-channel and the standard deviation value of the CINR values measured for individual bands, is smaller than a maximum threshold value of the standard deviation value of the CONK values measured for individual bands, and when the average CINR value of the whole bandwidth is larger than a threshold value of the average CINR value of the whole bandwidth, the SS transmits the C1 to the BS through the CQICH, thereby requesting the BS to transition the sub-channel assignment scheme to the band MAC sub-channel assignment scheme from the normal sub-channel assignment scheme. Herein, the SS transmits the REP-RSP message as well as the C1 to the BS. The REP-RSP message includes both information for the five bands having the best channel conditions in the whole bandwidth and the CQI having the measured CINR values.

Next, a case of conversion to the normal sub-channel assignment scheme from the band AMC sub-channel assignment scheme will be described. When the maximum standard deviation value of the CINR values measured for individual bands during the time period defined in the field "Band AMC Release Timer" is larger than the threshold value defined in the field "Band AMC Release Threshold", the SS transmits the third codeword C3 to the BS through the CQICH in a state in which the SS receives the sub-channel through the band AMC sub-channel assignment scheme, thereby requesting the BS to transition the sub-channel assignment scheme to the normal sub-channel assignment scheme from the band AMC sub-channel assignment scheme. That is, in a process in which the SS requests the BS to transition the sub-channel assignment scheme to the normal sub-channel assignment scheme from the band AMC sub-channel assignment scheme, when the maximum standard deviation value of the CINR values of individual bands, which is measured for time period required in order to measure the average CINR value of the whole bandwidth for the assigned sub-channel and the standard deviation value of the CINR values measured for individual bands, is larger than the maximum threshold value of the standard deviation value of the CINR values measured for individual bands, the SS transmits the C3 to the BS through the CQICH, thereby requesting the BS to transition the sub-channel assignment scheme to the normal sub-channel assignment scheme from the band AMC sub-channel assignment scheme.

Last, a case in which the five bands having the best channel conditions selected by the SS are varied in a state in which the SS has received the sub-channel through the band AMC sub-channel assignment scheme will be described. When a CINR value of another band excluding the five bands selected for the band AMC sub-channel assignment scheme is larger than the average CINR value of the whole bandwidth during the time period defined in the field "Band AMC Allocation Timer", the SS transmits the C1 to the BS through the CQICH, thereby changing the selected band, similarly to the case of the conversion to the band AMC sub-channel assignment scheme from the normal sub-channel assignment scheme as described above.

As described above, the present invention newly defines and uses undefined codewords from among codewords assigned to a CQICH in a BWA communication system, thereby stably performing conversion between a normal sub-channel assignment scheme and a band AMC sub-channel assignment scheme and assigning a sub-channel. As a result, it is possible to improve an overall reliability of the BWA system.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for requesting a Base Station (BS) to assign sub-channels to a Subscriber Station (SS) in a communication system, the method comprising:
   determining a channel quality of sub-channels assigned using a normal sub-channel assignment scheme;
   transmitting, to the BS, a first codeword C1 of a Channel Quality Indicator CHannel (CQICH) indicating a transition from the normal sub-channel assignment scheme to a band Adaptive Modulation and Coding (AMC) sub-channel assignment scheme, when the SS determines to transition from the normal sub-channel assignment scheme to the band AMC sub-channel assignment scheme based on the determined channel quality;
   transmitting a second codeword C2 of the CQICH and a report response message in response to a report request message received from the BS, wherein the report response message includes Carrier-to-Interference Noise Ratio (CINR) measurements of bands selected for the band AMC sub-channel assignment scheme; and
   transmitting, to the BS, differential Channel Quality Indicators (CQI) of the selected bands.

2. The method as claimed in claim 1, further comprising:
   transmitting a third codeword C3 of the CQICH indicating a transition from the band AMC sub-channel assignment scheme to the normal sub-channel assignment scheme, when the SS determines to transition from the band AMC sub-channel assignment scheme to the normal sub-channel assignment scheme.

3. The method as claimed in claim 2, further comprising:
   transmitting a regular CQI of a whole bandwidth of sub-channels assigned to the SS after transmitting the third codeword.

4. The method as claimed in claim 3, further comprising retransmitting the third codeword and the regular CQI of the whole bandwidth to the BS, until the BS allocates normal sub-channels of the normal sub-channel assignment scheme.

5. The method as claimed in claim 1, wherein the selected bands have better channel conditions from a whole bandwidth of sub-channels assigned to the SS.

6. The method as claimed in claim 1, wherein the first codeword is retransmitted to the BS when the selected bands having better channel conditions change due to a lapse of a predetermined time period.

7. The method as claimed in claim 1, wherein the channel quality includes a maximum of standard deviations of individual bands Carrier-to-Interference Noise Ratio (CINR) measurements and an average CINR of a whole bandwidth of the sub-channels assigned to the SS.

8. A method for assigning, by a Base Station (BS), sub-channels to a Subscriber Station (SS) in a communication system, the method comprising:
   receiving a first codeword C1 of a Channel Quality Indicator CHannel (CQICH) from the SS, the first codeword indicating a transition from a normal sub-channel assignment scheme to a band Adaptive Modulation and Coding (AMC) sub-channel assignment scheme;
   transmitting a report request message to the SS;
   receiving a second codeword C2 of the CQICH and a report response message from the SS in response to the report request message, wherein the report response message includes Carrier-to-Interference Noise Ratio (CINR) measurements of bands selected for the band AMC sub-channel assignment scheme; and
   receiving differential Channel Quality Indicators (CQI) of the selected bands.

9. The method as claimed in claim 8, further comprising:
   receiving a third codeword C3 of the CQICH indicating a transition from the band AMC sub-channel assignment scheme to the normal sub-channel assignment scheme; and
   receiving a regular channel quality indicator of a whole bandwidth of sub-channels assigned to the SS.

10. A system for assigning sub-channels in a communication system, the system comprising:
    a Base Station (BS); and
    a Subscriber Station (SS) for determining a channel quality of sub-channels assigned by a normal sub-channel assignment scheme, transmitting, to the BS, a first codeword C1 of a Channel Quality Indicator CHannel (CQICH) indicating a transition from the normal sub-channel assignment scheme to a band Adaptive Modulation and Coding (AMC) sub-channel assignment scheme, when the SS determines to transition from the normal sub-channel assignment scheme to the band AMC sub-channel assignment scheme based on the determined channel quality, transmitting a second codeword C2 of the CQICH and a report response message in response to a report request message received from the BS, wherein the report response message includes Carrier-to-Interference Noise Ratio (CINR) measurements of bands selected for the band AMC sub-channel assignment scheme, and transmitting, to the BS, differential Channel Quality Indicators (CQI) of the selected bands.

11. The system as claimed in claim 10, wherein the SS transmits a third codeword C3 of the CQICH indicating a transition from the band AMC sub-channel assignment scheme to the normal sub-channel assignment scheme, when the SS determines to transition from the band AMC sub-channel assignment scheme to the normal sub-channel assignment scheme.

12. The system as claimed in claim 11, wherein the SS transmits a regular CQI of a whole bandwidth of sub-channels assigned to the SS, after transmitting the third codeword.

13. The system as claimed in claim 12, wherein the SS retransmits the third codeword C3 and the regular channel quality indicator of the whole bandwidth to the BS until the BS allocates normal sub-channels through the normal sub-channel assignment scheme.

14. The system as claimed in claim 10, wherein the selected bands have better channel conditions in a whole bandwidth of sub-channels assigned to the SS.

15. The system as claimed in claim 14, wherein the SS retransmits the first codeword C1 to the BS, when a predetermined number of best bands having the better channel conditions changes due to lapse of a predetermined time period.

16. The system as claimed in claim 10, wherein the channel quality includes a maximum of standard deviations of individual bands Carrier-to-Interference Noise Ratio (CINR) measurements and an average CINR of a whole bandwidth of the sub-channels assigned to the SS.

17. A system for assigning sub-channels in a communication system, the system comprising:
a Subscriber Station (SS); and
a Base Station (BS) for receiving a first codeword C1 of a Channel Quality Indicator CHannel (CQICH) from the SS, the first codeword indicating a transition from a normal sub-channel assignment scheme to a band Adaptive Modulation and Coding (AMC) sub-channel assignment scheme, transmitting a report request message to the SS, receiving a second codeword C2 of the CQICH and a report response message from the SS in response to the report request message, wherein the report response message includes Carrier-to-Interference Noise Ratio (CINR) measurements of bands selected for the band AMC sub-channel assignment scheme, and receiving differential Channel Quality Indicators (CQI) of the selected bands.

18. The system as claimed in claim 17, wherein the BS receives a third codeword C3 of the CQICH indicating a transition from the band AMC sub-channel assignment scheme to the normal sub-channel assignment scheme, and receives a regular CQI of a whole bandwidth of sub-channels assigned to the SS, after receiving the third codeword.

19. A system for assigning sub-channels in a communication system, the system comprising:
a Subscriber Station (SS) for determining a channel quality of sub-channels assigned by a normal sub-channel assignment scheme, transmitting a first codeword C1 of a Channel Quality Indicator CHannel (CQICH) indicating a transition from the normal sub-channel assignment scheme to a band Adaptive Modulation and Coding (AMC) sub-channel assignment scheme, when the SS determines to transition from the normal sub-channel assignment scheme to the band AMC sub-channel assignment scheme based on the determined channel quality, transmitting a second codeword C2 of the CQICH and a report response message in response to a report request message received, wherein the report response message includes Carrier-to-Interference Noise Ratio (CINR) measurements of bands selected for the band AMC sub-channel assignment scheme, and transmitting differential Channel Quality Indicators (CQI) of the selected bands; and
a Base Station (BS) for receiving the first codeword from the SS, transmitting the report request message to the SS, receiving the second codeword C2 and the report response message from the SS in response to the report request message, and receiving the differential CQI of the selected bands.

20. The system as claimed in claim 19, wherein the SS transmits a third codeword C3 of the CQICH indicating a transition from the band AMC sub-channel assignment scheme to the normal sub-channel assignment scheme, when the SS determines to transition from the band AMC sub-channel assignment scheme to the normal sub-channel assignment scheme.

21. The system as claimed in claim 20, wherein the SS transmits a regular CQI of a whole bandwidth of sub-channels assigned to the SS after transmitting the third codeword.

22. The system as claimed in claim 21, wherein the SS retransmits the third codeword C3 and the regular channel quality indicator of the whole bandwidth to the BS until the BS allocates normal sub-channels of the normal sub-channel assignment scheme.

23. The system as claimed in claim 21, wherein the SS receives the third codeword and receives the regular CQI of the whole bandwidth after receiving the third codeword.

24. The system as claimed in claim 19, wherein the selected bands have better channel conditions in a whole bandwidth of sub-channels assigned to the SS.

25. The system as claimed in claim 24, wherein the SS retransmits the first codeword C1 to the BS when a predetermined number of best bands having the better channel conditions change due to lapse of a predetermined time period.

26. The system as claimed in claim 19, wherein the channel quality includes a maximum of standard deviations of individual bands Carrier-to-Interference Noise Ratio (CINR) measurements and an average CINR of a whole bandwidth of the sub-channels assigned to the SS.

* * * * *